(12) United States Patent
McMurchie et al.

(10) Patent No.: US 8,136,077 B2
(45) Date of Patent: Mar. 13, 2012

(54) TIMING-OPTIMAL PLACEMENT, PIN ASSIGNMENT, AND ROUTING FOR INTEGRATED CIRCUITS

(75) Inventors: Larry E. McMurchie, Seattle, WA (US); Kenneth S. McElvain, Menlo Park, CA (US); Kenneth R. McElvain, Houston, TX (US)

(73) Assignee: Synopsys, Inc., Mountain View, CA (US)

( * ) Notice: Subject to any disclaimer, the term of this patent is extended or adjusted under 35 U.S.C. 154(b) by 237 days.

(21) Appl. No.: 12/433,476

(22) Filed: Apr. 30, 2009

(65) Prior Publication Data

US 2010/0218157 A1    Aug. 26, 2010

Related U.S. Application Data

(60) Provisional application No. 61/155,836, filed on Feb. 26, 2009.

(51) Int. Cl.
*G06F 17/50*    (2006.01)
(52) U.S. Cl. .......... 716/129; 716/108; 716/54; 716/113; 716/134; 716/132; 716/119; 716/126
(58) Field of Classification Search .................. 716/108, 716/113, 134, 132, 54, 119, 126, 129
See application file for complete search history.

(56) References Cited

U.S. PATENT DOCUMENTS

| | | | | |
|---|---|---|---|---|
| 5,537,055 | A * | 7/1996 | Smith et al. | 326/8 |
| 6,247,164 | B1 * | 6/2001 | Ashar et al. | 716/104 |
| 6,249,902 | B1 | 6/2001 | Igusa et al. | |
| 6,272,668 | B1 * | 8/2001 | Teene | 716/113 |
| 6,427,226 | B1 * | 7/2002 | Mallick et al. | 716/113 |
| 7,350,173 | B1 | 3/2008 | Ang et al. | |
| 2009/0187873 | A1 * | 7/2009 | Nikitin et al. | 716/13 |

OTHER PUBLICATIONS

Fu, Zhaohui et al., "Solving the Minimum-Cost Satisfiability Problem Using SAT Based Branch-and-Bound Search," ICCAD '06, Nov. 5-9, 2006, San Jose, CA, 9 pages.
Nag, Sudip K. et al., "Performance-Driven Simultaneous Placement and Routing for FPGA's," IEEE Transactions on Computer-Aided Design of Integrated Circuits and Systems, vol. 17, No. 6, Jun. 1998, pp. 499-518.
Bryant, Randal E., "Graph-Based Algorithms for Boolean Function Manipulation," IEEE Transactions on Computers, C-35-8, Aug. 1986, pp. 677-691.
Akers, Sheldon B., "Binary Decision Diagrams," IEEE Transactions on Computers, vol. C-27, No. 6, Jun. 1978, pp. 509-516.
Akers, Sheldon B, "Binary Decision Diagrams," IEEE Transactions on Computers, vol. C-27, No. 6, Jun. 1978, pp. 509-516.

(Continued)

*Primary Examiner* — Jack Chiang
*Assistant Examiner* — Brian Ngo
(74) *Attorney, Agent, or Firm* — Blakely, Sokoloff, Taylor & Zafman LLP; Judith A. Szepesi

(57) ABSTRACT

Techniques for timing-optimal placement, pin assignment, and routing for integrated circuits are described herein. According to one embodiment, a list of paths providing implementation possibilities is constructed. A means is provided for removing paths from the list as well as a means for committing paths to the implementation if such paths are required for making the circuit implementation valid. Paths with worst case attributes are iteratively removed from the list until all paths in the list are committed to the implementation. Other methods and apparatuses are also described.

23 Claims, 19 Drawing Sheets

OTHER PUBLICATIONS

Bashker, J, et al, "Static Timing Analysis for Nanometer Designs: A Practical Approach," Springer Science + Business Media LLC, 2009, Chapter 2, pp. 15-42.

Bryant, Randal E, "Graph-Based Algorithms for Boolean Function Manipulation," IEEE Transactions on Computers, vol. C-35, No. 8, Aug. 1986, 28 pages.

Eén, Niklas, et al, "An Extensible SAT-solver," <http://minisat.se/downloads/MiniSat.pdf>, SAT 2003, 23 pages.

Davis, Martin, et al, "A Computing Procedure for Quantification Theory," Journal of the Association for Computing Machinery, vol. 7, 1960, pp. 201-215.

Fu, Zhaohui, et al, "Solving the Minimum-Cost Satisfiability Problem Using SAT Based Branch-and-Bound Search," ICCAD '06, Nov. 5-9, 2006, 8 pages.

Nag, Sudip K, et al, "Performance-Driven Simultaneous Placement and Routing for FPGA's," IEEE Transactions on Computer-Aided Design of Integrated Circuits and Systems, vol. 17, No. 6, Jun. 1998, pp. 499-518.

* cited by examiner

| Variable | Path Beginning | Wire | Pin | Path Ending | Slack | |
|---|---|---|---|---|---|---|
| a | L(Z) | W1 | N(B) | N(Z) | -1.0 | ⎫ |
| b | L(Z) | W1 | N(A) | N(Z) | -0.8 | ⎬ Paths for signal l |
| c | L(Z) | W2 | N(B) | N(Z) | -0.4 | ⎬ |
| d | L(Z) | W2 | N(A) | N(Z) | -0.4 | ⎭ |
| e | M(Z) | W1 | N(B) | N(Z) | -0.6 | ⎫ |
| f | M(Z) | W1 | N(A) | N(Z) | -0.8 | ⎬ Paths for signal m |
| g | M(Z) | W2 | N(B) | N(Z) | -0.6 | ⎬ |
| h | M(Z) | W2 | N(A) | N(Z) | -0.5 | ⎭ |

FIG. 1C

| Variable | Path Beginning | Wire | Pin | Path Ending | Signal |
|---|---|---|---|---|---|
| a | M(Z) | | Q(A) | Q(Z) | Paths for signal m |
| b | M(Z) | | Q(B) | Q(Z) | |
| c | N(Z) | | Q(A) | Q(Z) | Paths for signal n |
| d | N(Z) | | Q(B) | Q(Z) | |
| e | O(Z) | | R(A) | R(Z) | Paths for signal o |
| f | O(Z) | | R(B) | R(Z) | |
| g | P(Z) | | R(A) | R(Z) | Paths for signal p |
| h | P(Z) | | R(B) | R(Z) | |
| i | Q(Z) | | S(A) | S(Z) | Paths for signal q |
| j | Q(Z) | | S(B) | S(Z) | |
| k | R(Z) | | S(A) | S(Z) | Paths for signal r |
| l | R(Z) | | S(B) | S(Z) | |

FIG. 4C

| Variable | Path Beginning | Wire | Pin | Path Ending | |
|---|---|---|---|---|---|
| a | M(Z) | | Q(A) | Q(Z) | ⎫ Paths for signal m |
| b | M(Z) | | Q(B) | Q(Z) | ⎭ |
| cw1 | N(Z) | W1 | Q(A) | Q(Z) | ⎫ |
| cw2 | N(Z) | W2 | Q(A) | Q(Z) | ⎪ Paths for signal n |
| dw1 | N(Z) | W1 | Q(B) | Q(Z) | ⎪ |
| dw2 | N(Z) | W2 | Q(B) | Q(Z) | ⎭ |
| ew1 | N(Z) | W1 | R(A) | R(Z) | ⎫ |
| ew2 | N(Z) | W2 | R(A) | R(Z) | ⎪ Paths for signal o |
| fw1 | N(Z) | W1 | R(B) | R(Z) | ⎪ |
| fw2 | N(Z) | W2 | R(B) | R(Z) | ⎭ |
| g | P(Z) | | R(A) | R(Z) | ⎫ Paths for signal p |
| h | P(Z) | | R(B) | R(Z) | ⎭ |
| i | Q(Z) | | S(A) | S(Z) | ⎫ Paths for signal q |
| j | Q(Z) | | S(B) | S(Z) | ⎭ |
| k | R(Z) | | S(A) | S(Z) | ⎫ Paths for signal r |
| l | R(Z) | | S(B) | S(Z) | ⎭ |

FIG. 5B

| Variable | Path Beginning | Pin | Path End | |
|---|---|---|---|---|
| a | M(Z) | OS1(A) | OS1(Z) | ⎫ |
| b | M(Z) | OS1(B) | OS1(Z) | ⎬ Paths for signal m |
| c | M(Z) | OS2(A) | OS2(Z) | ⎬ |
| d | M(Z) | OS2(B) | OS2(Z) | ⎭ |
| e | N(Z) | OS1(A) | OS1(Z) | ⎫ |
| f | N(Z) | OS1(B) | OS1(Z) | ⎬ Paths for signal n |
| g | N(Z) | OS2(A) | OS2(Z) | ⎬ |
| h | N(Z) | OS2(B) | OS2(Z) | ⎭ |
| i | OS1(Z) | P(A) | P(Z) | ⎫ |
| j | OS1(Z) | Q(A) | Q(Z) | ⎬ Paths for signal o |
| k | OS2(Z) | P(A) | P(Z) | ⎬ |
| l | OS2(Z) | Q(A) | Q(Z) | ⎭ |

FIG. 7B

| Variable | Path Beginning | Pin | Path End | |
|---|---|---|---|---|
| a | M(Z) | S1(A) | S1(Z) | Paths for signal m |
| c | M(Z) | S2(A) | S2(Z) | |
| d | M(Z) | S2(B) | S2(Z) | |
| e | N(Z) | S1(B) | S1(Z) | Paths for signal n |
| f | N(Z) | S2(A) | S2(Z) | |
| g | N(Z) | S2(B) | S2(Z) | |
| h | N(Z) | S3(A) | S3(Z) | |
| i | O(Z) | S2(A) | S2(Z) | Paths for signal o |
| j | O(Z) | S2(B) | S2(Z) | |
| l | O(Z) | S3(B) | S3(Z) | |
| s | S1(Z) | R(A) | R(Z) | Paths for signals p and q |
| t | S1(Z) | R(B) | R(Z) | |
| u | S2(Z) | R(A) | R(Z) | |
| v | S2(Z) | R(B) | R(Z) | |
| w | S3(Z) | R(A) | R(Z) | |
| x | S3(Z) | R(B) | R(Z) | |

TIMING-OPTIMAL PLACEMENT, PIN ASSIGNMENT, AND ROUTING FOR INTEGRATED CIRCUITS

RELATED APPLICATIONS

This application claims the benefit of U.S. Provisional Patent Application No. 61/155,836, filed Feb. 26, 2009, which is incorporated by reference herein in its entirety.

FIELD OF THE INVENTION

The present invention relates generally to automated circuit design. More particularly, this invention relates to timing-optimal placement, pin assignment, and routing for integrated circuit design.

BACKGROUND

For the design of digital circuits (e.g., on the scale of very large scale integration (VLSI) technology), designers often employ computer-aided techniques. Standard languages such as hardware description languages (HDLs) have been developed to describe digital circuits to aid in the design and simulation of complex digital circuits. Several hardware description languages, such as VHDL and Verilog, have evolved as industry standards. VHDL and Verilog are general-purpose hardware description languages that allow definition of a hardware model at the gate level, the register transfer level (RTL) or the behavioral level using abstract data types. As device technology continues to advance, various product design tools have been developed to adapt HDLs for use with newer devices and design styles.

In designing an integrated circuit with an HDL code, the code is first written and then compiled by an HDL compiler. The HDL source code describes at some level the circuit elements, and the compiler produces an RTL netlist from this compilation. The RTL netlist is typically a technology independent netlist in that it is independent of the technology/architecture of a specific vendor's integrated circuit, such as field programmable gate arrays (FPGA) or an application-specific integrated circuit (ASIC). The RTL netlist corresponds to a schematic representation of circuit elements (as opposed to a behavioral representation). A mapping operation is then performed to convert from the technology independent RTL netlist to a technology specific netlist, which can be used to create circuits in the vendor's technology/architecture. It is well known that FPGA vendors utilize different technology/architecture to implement logic circuits within their integrated circuits. Thus, the technology independent RTL netlist is mapped to create a netlist, which is specific to a particular vendor's technology/architecture.

Before the placement and routing operation, the timing of signals is typically estimated from parameters such as the fanout of a net and the estimated wire lengths (e.g., obtained from route estimation). After placement of components on the chip and routing of wires between components, timing analysis (e.g., timing simulation or static timing analysis) can be performed to accurately determine the signal delays between logic elements.

A slack associated with a connection is the difference between a required time and an arrival time. The arrival time of a signal is the time elapsed for a signal to arrive at a certain point. The reference, or time 0.0, is often taken as the arrival time of a clock signal. To calculate the arrival time, delay calculation of all the components in the path will be required. The required time is the latest time at which a signal can arrive without making a clock cycle longer than desired. A positive slack at a node implies that the arrival time at that node may be increased by an amount without affecting the overall delay of the circuit. Conversely, negative slack implies that a path may be too slow, and the path must be sped up (or the reference signal delayed) if the whole circuit is to work at the desired speed.

At a detailed level, FPGA (field programmable gate array) routing architectures exhibit many constraints between routing resources and pin assignments (on logic blocks, RAMs, DSPs, etc.). Such constraints are becoming more common in new architectures as the complexity of logic blocks increases and FPGA architects introduce fast local connections for delay optimization. Increasingly, the current approach of separating placement, pin assignment, and routing is not a viable approach and sacrifices delay and therefore QOR (quality of result). In this case QOR degradation implies a longer clock period or a decrease in placement density.

Routing and Pin Assignment Example

FIG. 1A shows a netlist for a pin assignment and routing example. FIG. 1B shows an implementation where signal l and signal m vie for the use of wires W1 and W2 and pins N(A) and N(B). In this example, possible path assignments for l and m and respective slacks are given in the table as shown in FIG. 1C. As can be seen, signal l can reach the load cell using one of four possible paths a, b, c, d. Similarly, signal m can reach the load cell using one of four possible paths e, f, g, h. The goal is to find a path assignment for each of the signals l and m such that the overall or circuit slack is maximized and the paths satisfy mutual constraints.

The first constraint is completeness, which requires the existence of paths for both l and m:

completeness=(a|b|c|d) & (e|f|g|h)

In other words one path of [a, b, c, d] and one path of [e, f, g, h] must be chosen. The second constraint is a lack of conflict between the resource usage of the chosen paths. In other words, only one signal can occupy each of the routing resources W1, W2, and only one signal can occupy each of the pin resources N(A) and N(B). In this case conflict is rigorously defined as conflict=(a & (e|f|g))|(b & (e|f|h))|(c & (e|g|h))|(d & (f|g|h))

For example, referring to FIG. 1C, when (a & (e|f|g)) is true, there is a conflict. Since path a occupies wire W1 and pin N(B), if any of the other paths also occupies either wire W1 or pin N(B), then there is a conflict. As can be seen from FIG. 1C, at least one of the paths e, f, and g occupies either wire W1 or pin N(B), which leads to a conflict. Similarly, when one of the (b & (e|f|h)), (c & (e|g|h)), or (d & (f|g|h)) combinations is true, there will be a conflict. Several scenarios for assigning signals to paths may exist herein.

Scenario A. Independent greedy assignment of paths. In this scenario a list of signals ordered by estimates of criticality has been constructed. Such estimates, being derived from a previously executed process, are only approximate and do not necessarily correspond to slacks on possible paths. A path is chosen for each signal, beginning with the most critical signal. The path chosen maximizes the slack for that signal (e.g., best slack time). Once a path has been chosen for a signal, the choice is not revisited. Subsequent assignments of signals must "live with" the choices remaining to them, i.e. be assigned a path which does not create a conflict with previously assigned signals. This type of assignment is thus a greedy assignment.

Referring back to FIG. 1C, in this example, if signal l has been deemed most critical, we would find a path that maximizes its slack. There are two path choices that give the maximum slack (−0.4) for l:

Assigning l to c gives this maximum slack and, in order to prevent a conflict, requires assigning m to f. The resulting overall slack is then determined by this assignment and is −0.8.

Assigning l to d gives the same maximum slack and, in order to prevent a conflict, requires assigning m to e. This gives an overall slack of −0.6.

If, on the other hand, signal m has been deemed to be the most critical, path h maximizes its slack. This requires that signal l uses path a, which results in an overall slack of −1.0. Thus the overall slack is dependent upon the ordering in which signals are assigned slacks.

Scenario B. Pin assignment followed by routing. In this approach, pins are assigned in a mutually-exclusive manner and followed by routing (i.e. wire assignments). One implementation is:

Construct a signal ordering based upon some (unspecified) measure of criticality. Assign pins greedily, giving the most critical signals the pins with the most slack. The idea here is to give the most critical signals the best choice of pins.

Route signals to their selected pins using the wire choices available. Any algorithm for routing may be used, such as, for example, the negotiated congestion heuristic. Nearly all routers employ such heuristics and do not give optimal solutions.

Upon examination of FIG. 1C, there are two cases that must be considered. If l is the most critical signal of l and m, then we could assign l to either N(A) or N(B), as they both have the same slack (−0.4). If we chose N(A), m would be assigned to N(B). The best that the router can do with this pin assignment is to assign l to d and m to e, resulting in a slack of −0.6. There is no guarantee that the router will find this assignment, as routers employ heuristics, which are not guaranteed to find optimal solutions. If we chose to assign l to N(B), m must be assigned to N(A) and the best the router can do with this pin assignment is to assign l to c and m to f, resulting in a slack of −0.8.

If m is the most critical signal we must assign it to N(A), and l must be assigned to N(B). The best the router could do is assign m to f and l to c, giving a slack of −0.8. Again note that the router may not be able to find this assignment and may find another assignment with a worse slack.

Scenario C. Exhaustive path assignment. This method compares all combinations of path assignments for each signal and selects a combination with the best overall slack. In this case, there are (4 paths*4 paths) or 16 combinations. For larger numbers of signals and paths, this method is clearly infeasible. Here, the best assignment (best overall slack) employs paths d and e, giving an overall slack of −0.6.

SUMMARY OF THE DESCRIPTION

Techniques for timing-optimal placement, cell replication, pin assignment, and routing for integrated circuits are described herein. According to one aspect of the invention, a solution is provided to combine placement, cell replication, pin assignment, and routing into a single problem formulation. It is a technique for refinement of a placement, routing, and pin assignment in a limited performance-critical region. It relies upon a formulation in terms of a general satisfiability problem that can be solved using standard techniques, such as, for example, a SAT (Boolean satisfiability problem) or BDD (binary decision diagram) problem solver, or backtracking procedure. By applying a timing engine and iteratively eliminating possible solutions in the satisfiability problem, a timing-optimal solution may be found.

According to one embodiment, a satisfiability problem S is constructed containing allowable placement sites, pin assignments and paths between placement sites. The worst-slack paths in S are iteratively eliminated until choices of paths are forced. By construction, the final forced solution is timing-optimal with respect to the original problem formulation. As a result, the circuit performance is improved through simultaneous consideration of placement, cell replication, pin assignment, and routing. Density in congested areas may also improved by assigning pins and routes during placement.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 1A-1C are diagrams illustrating a routing and pin assignment problem.

FIGS. 4A-4C are diagrams illustrating a multi-level routing and pin assignment problem FIGS. 5A-5C are diagrams illustrating a technique for routing and pin assignment of an integrated circuit according to another embodiment of the invention.

FIGS. 6 and 7A-7B are diagrams illustrating a technique for placement, replication, pin assignment and routing an integrated circuit according to another embodiment of the invention.

FIGS. 8 and 9A-9B are diagrams illustrating a technique for placement, replication, pin assignment and routing an integrated circuit according to another embodiment of the invention.

DETAILED DESCRIPTION

Techniques for timing-optimal placement, pin assignment, and routing for integrated circuits are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to one embodiment, a solution is provided to combine placement, pin assignment, and routing into a single problem formulation to be applied in a performance-critical region. The formulation comprises a general satisfiability problem that can be solved using standard techniques, such as, for example, a SAT (Boolean satisfiability problem) or BDD (binary decision diagram) problem solver. By applying a timing engine and iteratively eliminating possible solutions in the satisfiability problem, a timing-optimal solution may be found.

According to one embodiment, a satisfiability problem S is constructed containing allowable placement sites, pin assignments and route paths between placement sites. The worst-slack route paths in S are iteratively eliminated until choices of placement sites, pin assignments, and route paths are forced. By construction, the final forced solution is timing-optimal with respect to the original problem formulation. As a result, the circuit performance is improved through simultaneous consideration of placement, pin assignment, and routing. Density in congested areas may also improved by assigning pins and routes during placement.

Routing/Pin Assignment Embodiments

According to one embodiment, a list of possible paths through routing resources and pins is constructed. Based on timing characteristics of the paths, certain possible paths are eliminated from the list, starting from ones with the worst timing characteristics. In one embodiment, the timing characteristics are determined based on slacks of the paths.

Figure 1A:
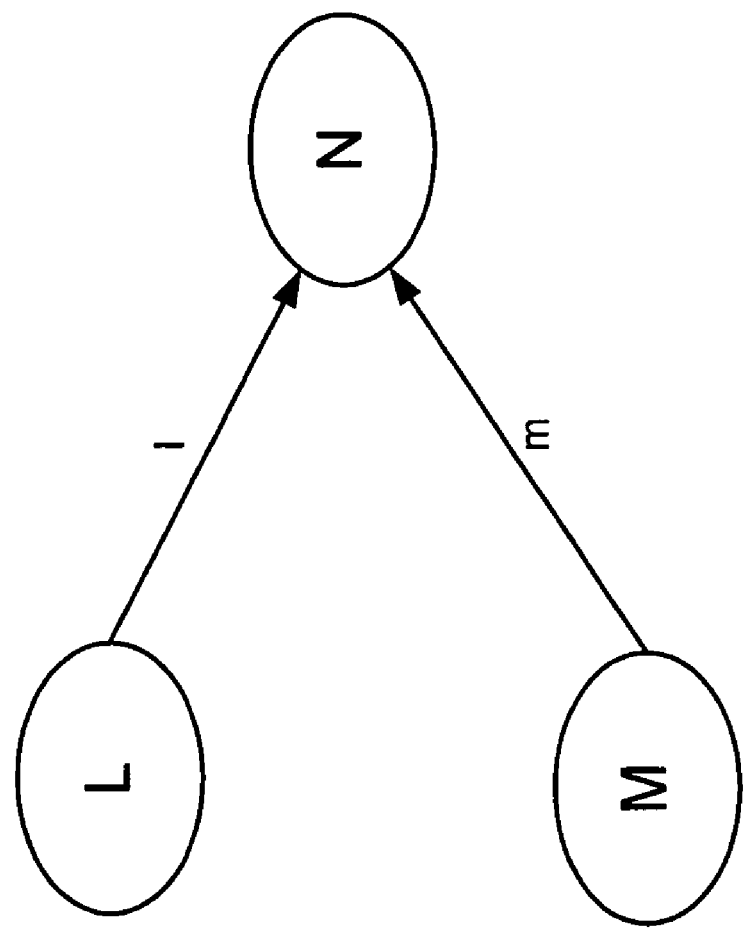
Figure 1B:
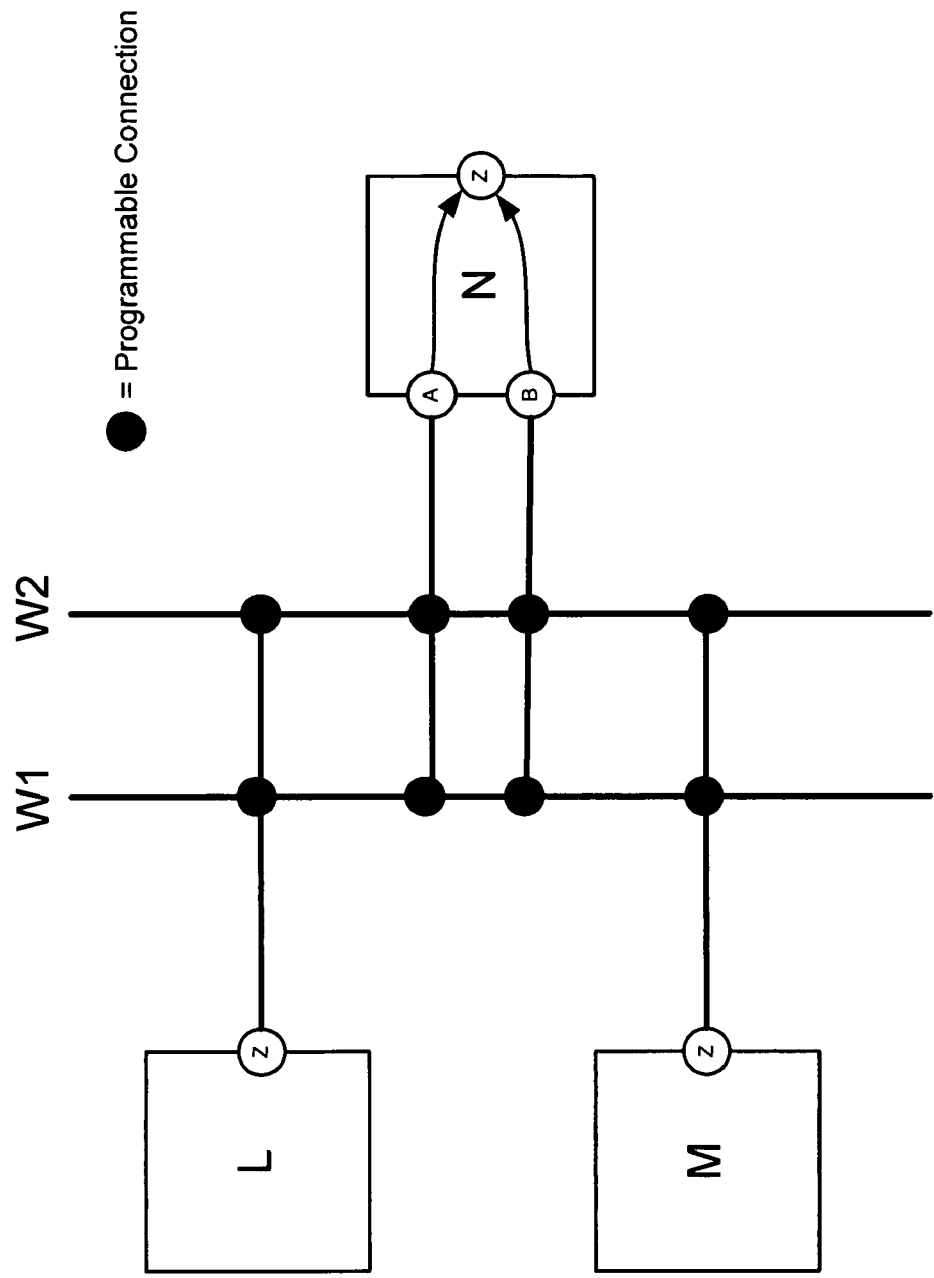

That is, paths in the list may be removed or eliminated according to their slack orders. Referring back to FIGS. 1B-1C, since path a has the worst slack of −1.0, path a is removed first from the list. After removing path a, path b has the worst slack (−0.8) among the remaining paths. Thus, path b is then removed from the list. As shown in FIGS. 1B-1C, since paths a and b have been removed, paths starting from cell L have to use wire W2. Thus, paths starting from cell M cannot use wire W2. As a result, the removal of path b (slack=0.8) forces the elimination of signal routes g (slack=−0.6) and h (slack=−0.5), since paths g and h use wire W2.

After removing paths a, b, g, and h, the remaining paths would be c, d, e, and f. Among the remaining paths c, d, e, and f, path f (slack=−0.8) is removed from the list since it has the worst slack. Since path f has been eliminated, path e (slack=−0.6) has to stay. Since path e uses wire W1 and pin B, path c (slack=−0.4) has to be eliminated since it uses pin B as well. Thus, the only choices remaining are signal routes d and e, which give an overall slack of −0.6, the same as in the exhaustive path assignment method, but with a higher efficiency.

Figure 2A:
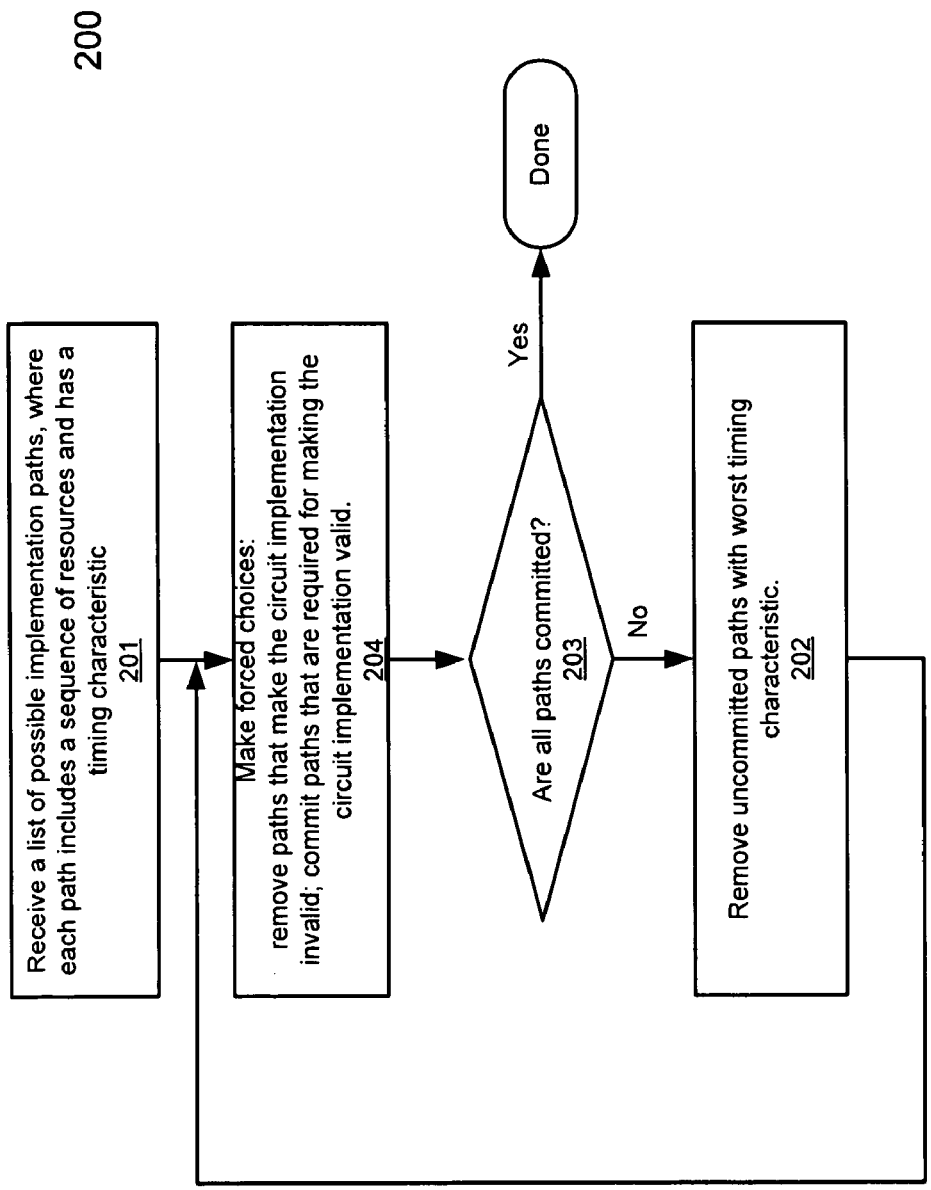
FIGS. 2A and 2B are flow diagrams illustrating processes for routing and/orpin assignment according to certain embodiments of the invention.

FIG. 2A is a flow diagram illustrating a process for routing and/or pin assignment according to one embodiment of the invention. Note that process 200 may be performed by processing logic which may include software, hardware, or a combination of both. For example, process 200 may be performed for refinement of a placement, routing, and pin assignment in a limited performance-critical region. Referring to FIG. 2A, at block 201, a list of possible implementation paths of a portion of an integrated circuit (IC) netlist is received, which netlist may be compiled and generated from an HDL compiler. Each path includes a sequence of resources along a timing path.

At block 204, forced choices are made on the list of possible paths. Paths are committed to the list of paths if there are no other possible paths that implement the same connection in the netlist. Paths may be removed from the list of paths if they make the circuit implementation invalid. The choice of which paths to remove and the ordering of removal is the subject of this invention. Embodiments of two methods are described in subsequent FIGS. 2B and 3. Block 203 determines whether all remaining paths in the list have been committed. If so, the process has completed. If uncommitted paths remain, the uncommitted path with the worst timing characteristic is removed from the list and control transferred to block 204.

At completion of process 200, the path with the worst slack that must be kept in the list of paths has been determined. The method is optimal in the sense that no other choice of paths will yield a slack better than this path. The circuit implementation as a whole has a slack equal to this worst slack.

Figure 2B:
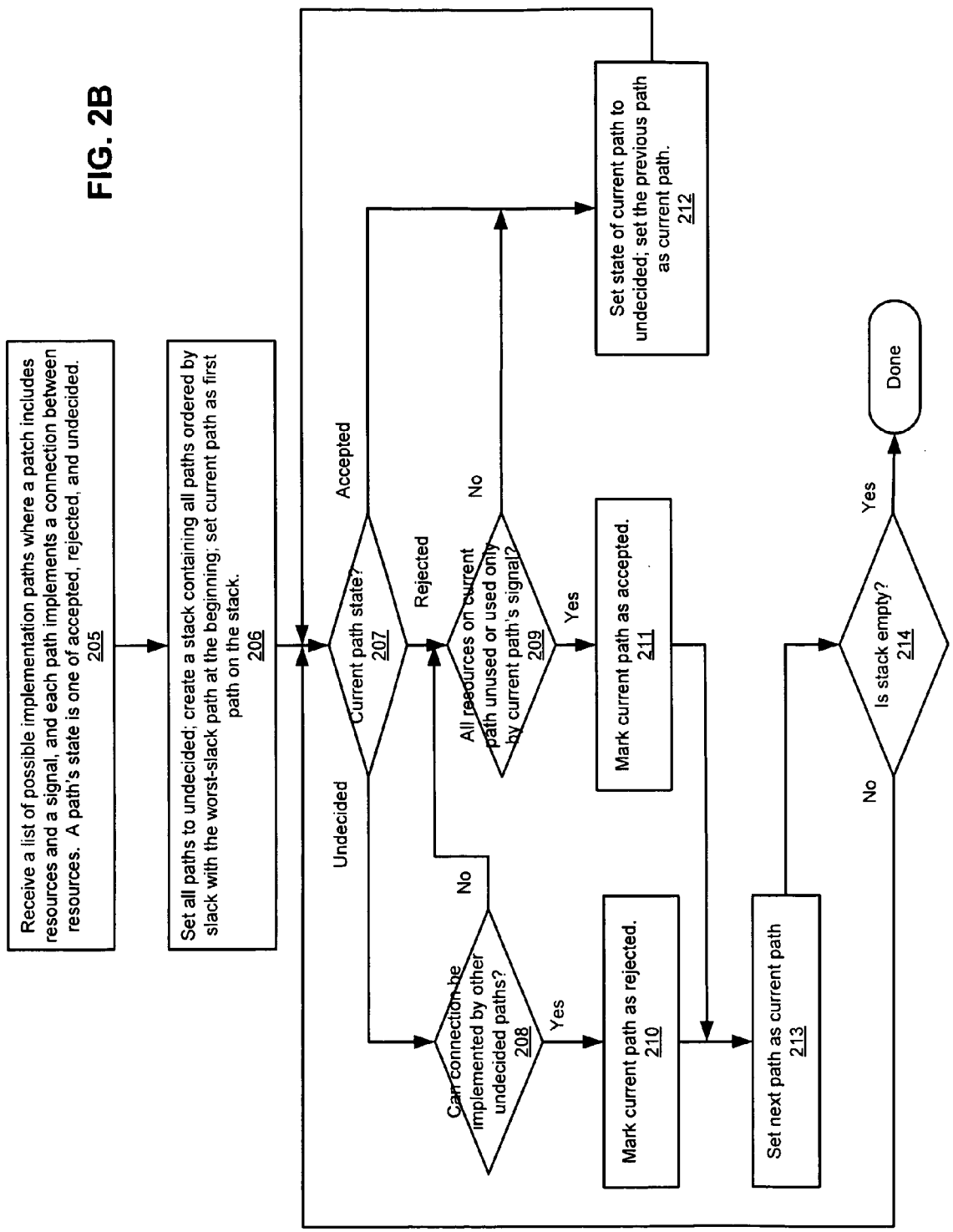

FIG. 2B describes in detail process 200A, one embodiment of process 200. At block 205 a list of possible implementation paths is received. Each path consists of a sequence of resources and implementations a connection, as for example between a driver pin and a load pin. A path also includes a signal. Connections may share signals, as for example connections between a source pin and multiple load pins. A path may have one of three states, being accepted, rejected, or undecided. In block 206 all paths are set to undecided and a stack is constructed consisting of all paths ordered by their slack values. The current path is initialized to the first path (i.e. the worst slack path). In block 207, the state of the current path is examined. If undecided, it is determined if the connection it implements can be implemented by other undecided paths (block 208). If it can be implemented by other paths, those paths will have better slack values because of the ordering of the paths in the stack. Therefore in block 210 the path is rejected and the current path is updated to the next path in the stack. Provided the stack is nonempty (block 214), control passes back to block 207.

If the answer to block 208 is No, then the current path is examined in block 209 to see if the set of resources used by the current path are unused by any accepted paths or any other paths containing the same signals. If the answer is Yes, the current path is free to be used and it is marked as accepted (block 211), and the stack advanced to the next path in block 213. If, however, the answer to block 209 is No, then a backtracking step must be performed in block 212 which rips up the assignment of the previous path (or paths) in the stack in order to find assignments of other paths that do not use the resources required by the current path.

According to another embodiment, process 200 may be performed using a satisfiability problem solver. A satisfiability problem S is constructed containing variables representing paths and/or resources and constraints between variables representing constraints between paths and/or resources. Expressions representing worst-slack paths in S are iteratively made false until the remaining paths are forced (i.e., no more paths can be removed; without creating an unsolvable problem). By construction, the final forced solution is timing-optimal with respect to the original problem formulation. As a result, the circuit performance is improved through the choice of paths which embed considerations of cell placement, pin assignment and routing resources.

In one embodiment, a satisfiability problem S is defined such that there is one variable for each possible path. A path includes a sequence of resources along a timing path. A set of constraints between paths arise because of constraints between the resources included in the paths. Such constraints between paths (and therefore between variables in S) are included in S. One constraint requires that for each source/load pair in the netlist, there must exist a path (completeness).

Another constraint is that each routing resource and pin may be occupied by only one signal (lack of conflict). The satisfiability problem S is then defined as S=completeness & !conflict According to one embodiment, a satisfiability problem may be implemented using a satisfiability problem solver, such as, for example, SAT or BDD problem solver or backtracking procedure. Satisfiability is the problem of determining if the variables of a given Boolean formula can be assigned in such a way as to make the formula evaluate to TRUE. Equally important is to determine whether no such assignments exist, which would imply that the function expressed by the formula is identically FALSE for all possible variable assignments. In this latter case, one can say that the function is unsatisfiable; otherwise it is satisfiable. To emphasize the binary nature of this problem, it is frequently referred to as Boolean or propositional satisfiability.

The Boolean satisfiability problem (also referred to as SAT) is a decision problem, whose instance is a Boolean expression written using only AND, OR, NOT, variables, and parentheses. The question is: given the expression, is there some assignment of TRUE and FALSE values to the variables that will make the entire expression true? A formula of propositional logic is said to be satisfiable if logical values can be assigned to its variables in a way that makes the formula true.

A BDD is a data structure that is used to represent a Boolean function. A Boolean function can be represented as a rooted, directed, acyclic graph, which consists of decision nodes and two terminal nodes called 0-terminal and 1-terminal. Each decision node is labeled by a Boolean variable and has two child nodes: a low child and a high child. A path from the root node to the 1-terminal represents a (possibly partial) variable assignment for which the represented Boolean function is true. As the path descends to a low child (high child) from a node, then that node's variable is assigned to 0 (1). BDDs are extensively used in CAD (computer-aid design) software to synthesize circuits and in formal verification. Every arbitrary BDD can be directly implemented by replacing each node with a 2-to-1 multiplexer; each multiplexer can be directly implemented by a 4-LUT (lookup table) in a FPGA (field programmable gate array).

According to one embodiment, the problem to be solved using a satisfiability problem solver is given a variable to be assigned to a value such as a FALSE value, whether the problem is still solvable. For example, given a variable for a particular path to be set to FALSE in an attempt to remove it from the list because such a path contains the worst slack, the problem solver is invoked to determine whether the problem is still solvable (e.g., whether there is at least one path connecting each source cell to a load cell). If the problem cannot be solved after the removal, the selected path cannot be removed and it must stay in the list (i.e., setting the corresponding variable to TRUE). Otherwise, the next path from the list having the next worst slack is selected, set to FALSE, and an attempt is made to remove it from the list using the problem solver. This process can be iteratively performed until the remaining choices are forced (i.e., there is only one path remaining for a connection between a particular source cell to a particular load cell).

Figure 3:
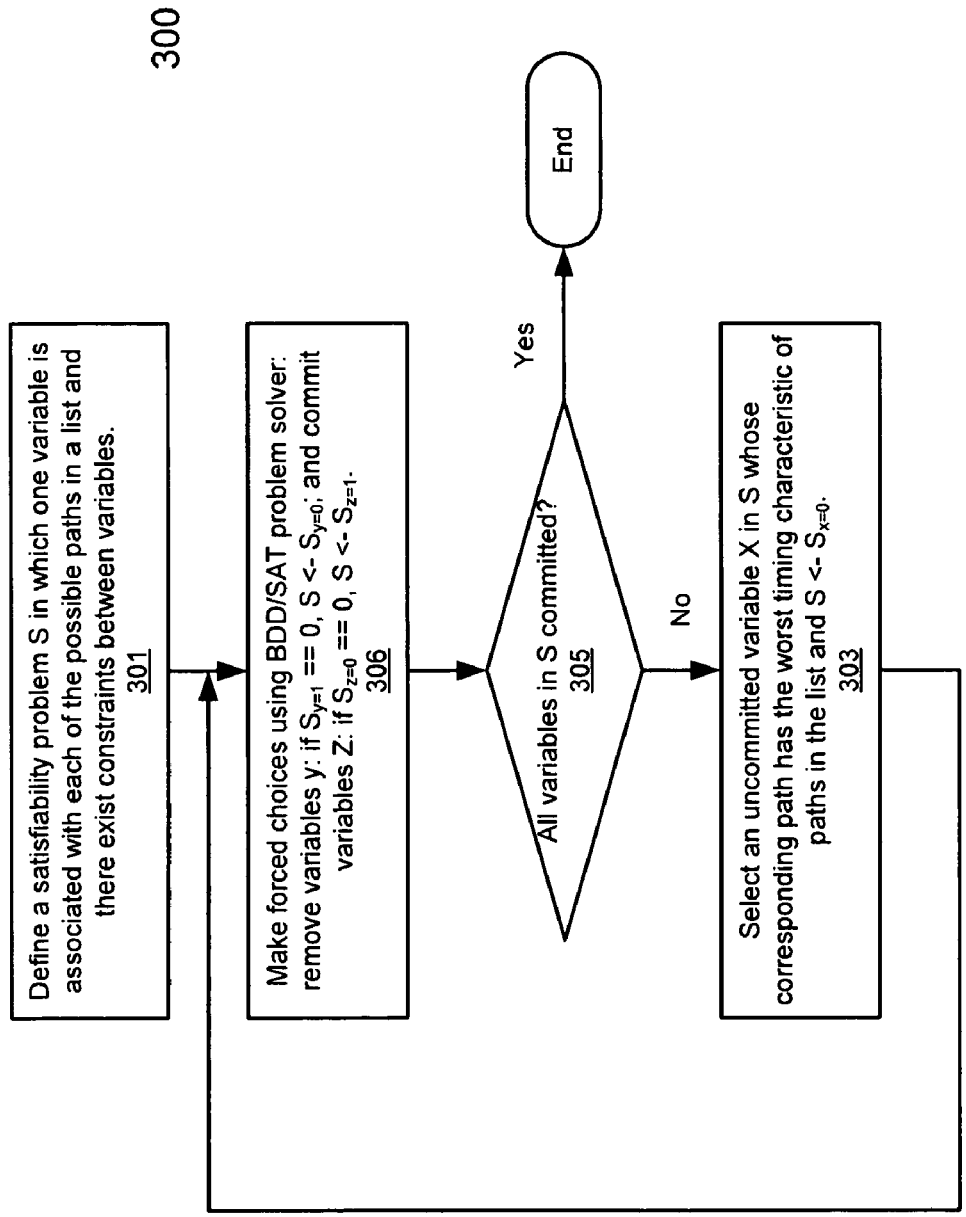
FIG. 3 is a flow diagram illustrating a process for routing and/or pin assignment using a satisfiability problem solver according to one embodiment of the invention.

FIG. 3 is a flow diagram illustrating a process for routing and/or pin assignment using a satisfiability problem solver according to one embodiment of the invention. Note that process 300 may be performed by processing logic which may include software, hardware, or a combination of both. Process 300 may be performed for refinement of a placement, routing, and pin assignment in a limited performance-critical region. Referring to FIG. 3, at block 301, a satisfiability problem S is defined in which one variable is associated with and represents each of the possible paths in a list. A path consists of a sequence of resources and/or pins. Constraints include the existence of a path for each driver/load path (completion) and the occupation of each routing resource/pin by at most one signal (lack of conflict). At block 306 tests of all variables in S for forced choices are made using a BDD or SAT solver. If the cofactor of S with y=1 evaluates to 0, i.e. S is unsolvable when y=1, then variable y and hence its path can be removed from the problem. If the cofactor of S with variable z=0 evaluates to 0, then S is only solvable with z=1 and variable z is therefore committed. A test of all variables in S is performed in block 305 to see if they are committed. If so, the process has completed. If not, the uncommitted variable x whose path has the worst timing characteristic (block 305) is removed from the list by constructing a new problem as the cofactor of S with x=0. Control returns to block 306 where more forced choices may be made.

Multilevel Path Embodiments

Figure 4A:
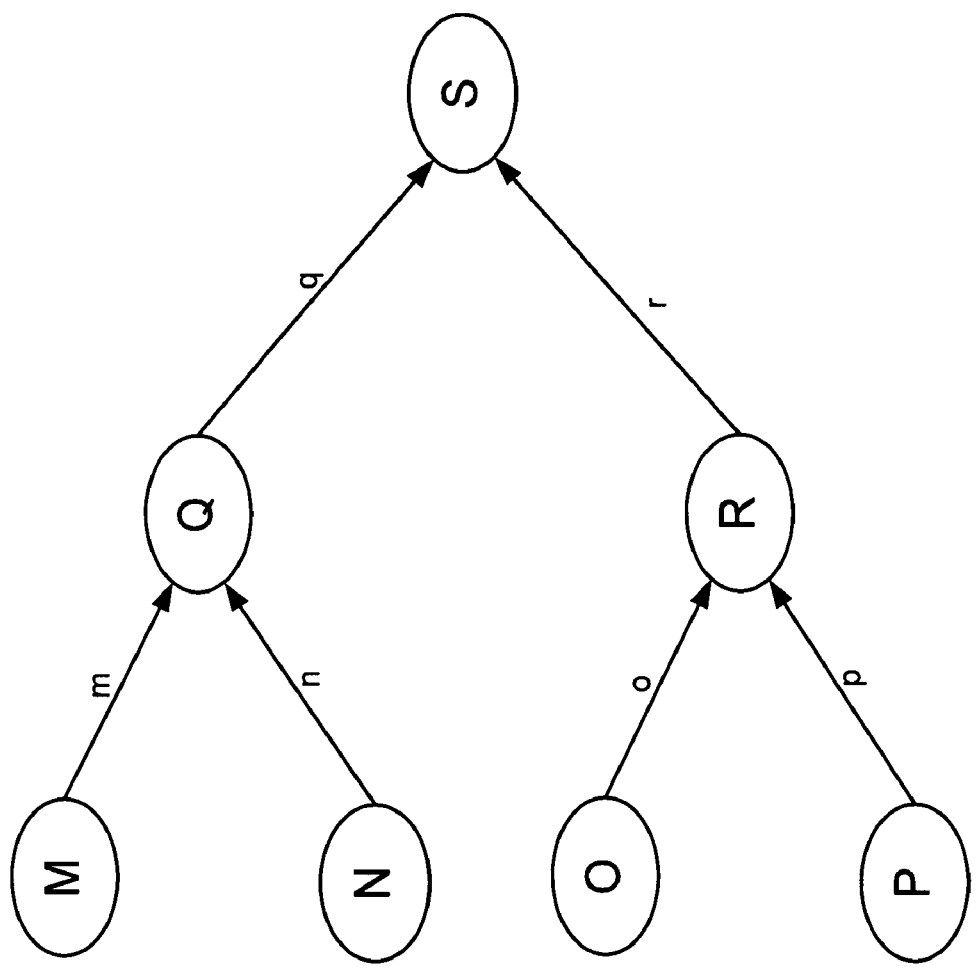
Figure 4B:
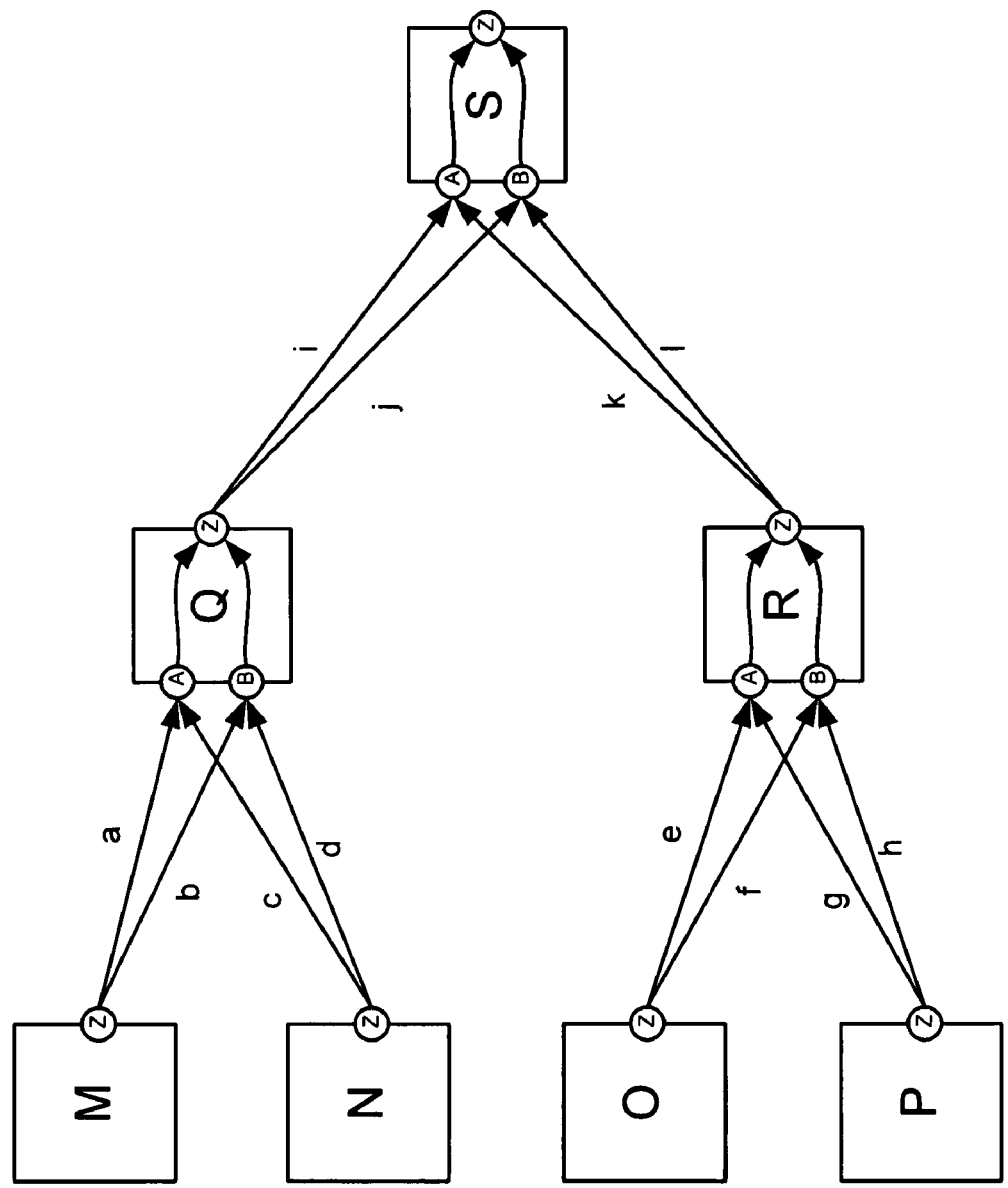

According to certain embodiments of the invention, the techniques set forth above can be applied to multiple level paths (i.e., paths that contain at least one intermediate cell between a source cell and a load cell). FIG. 4A shows a netlist for a multilevel path example. FIG. 4B shows a possible implementation for FIG. 4A according to one embodiment of the invention. In this example, referring to FIGS. 4A-4B, signals m and n vie for the use of pins Q(A) and Q(B); o and p are vie for the use of R(A) and R(B); and q and r are vie for the use of S(A) and S(B). FIG. 4C contains an enumeration of all possible paths represented in FIG. 4B.

Given slacks for all the paths, this problem can be solved by splitting the problem into three separate sub-problems: 1) one with path variables (a, b, c, d); 2) another with variables (e, f, g, h); and 3) another with variables (i, j, k, l). These three sub-problems can be solved independently using the methods employed in the simple routing example as described above. Separability of the sub-problems arises because the paths are non-interacting. One can simply find path choices with the best slack in each sub-problem. Consider solving sub-problem 1) first. At first it does not appear that this sub-problem may be solved by itself because the slacks for each path are dependent upon the required time at Q(Z) and by inference, the slacks of the paths determined in the solution of sub-problem 3). However, since all paths of sub-problem 1) end at Q(Z), only the relative slacks of these paths are important for the solution of the sub-problem. The final solution of sub-problem 1) is therefore independent of the other sub-problems. The solution to the complete problem containing all three sub-problems is the union of the paths obtained for each of the three sub-problems.

Figure 5A:
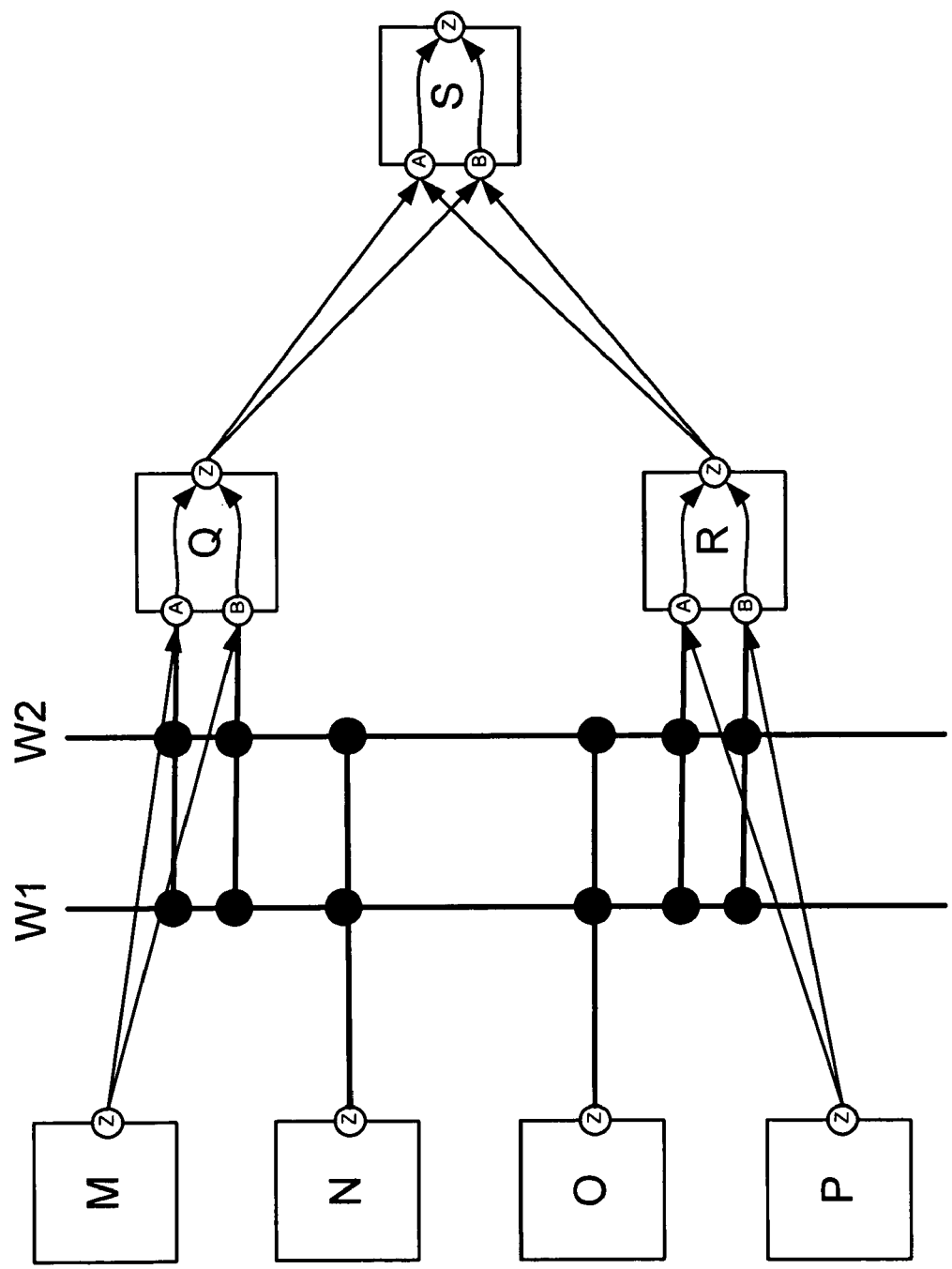

FIG. 5A shows a modification of the problem of 4B according to an alternative embodiment. In this example, signals n and o can complete for wires W1 and W2. Because of this competition, the problem is no longer separable into sub-problems. In this case, the problem is formulated as shown in FIG. 5B. The completeness requirement is given by:

(a|b) & (cw1|cw2|dw1|dw1|dw2) & (ew1|ew2|fw1|fw2) & (g|h) & (i|j) & (k|l)

A conflict occurs when:

conflict=(a & (cw1|cw2))|(b & (dw1|dw2))|((cw1|dw1) & (ew1|fw1))|((cw2|dw2) & (ew2|fw2))|(g & (ew1|ew2))|(h & (fw1|fw2))|(i & k)|(j & l)

The satisfiability problem is then formulated in a manner similar to before:

completeness & !conflict

In this multilevel problem, we construct 2-level paths using a combination of variables, with appropriate assignment of slack values:

| | | | | | |
|---|---|---|---|---|---|
| a & i, | a & j, | b & i, | b & j, | cw1 & i, | cw1 & j, |
| cw2 & i, | cw2 & j, | dw1 & i, | dw1 & j, | dw2 & i, | dw2 & j, |
| ew1 & k, | ew1 & l, | ew2 & k, | ew2 & l, | fw1 & k, | fw1 & l, |
| fw2 & k, | fw2 & l, | g & k, | g & l, | h & k, | h & l |

Figure 5C:
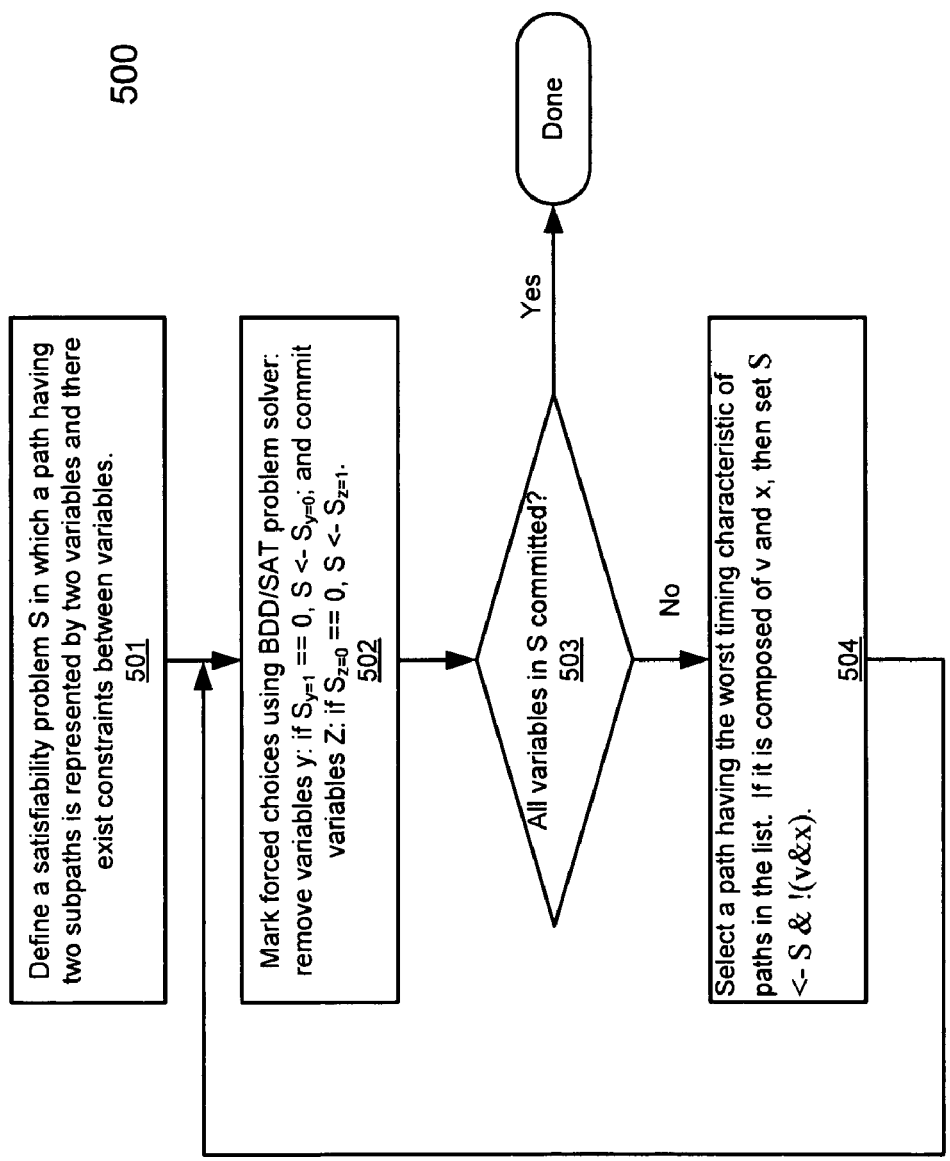

The satisfiability problem is then solved for forced choices by successively eliminating the above 2-level paths in slack order (e.g., worst to best). FIG. 5C is a flow diagram illustrating a process for multilevel paths according to another embodiment of the invention. Note that process 500 may be performed by processing logic which may include software, hardware, or a combination of both.

Referring to FIG. 5C, at block 501, a satisfiability problem S is defined in which each 2-level path is represented by two variables each representing a sub-path. At block 502 tests of all variables in S for forced choices are made using a BDD or SAT solver. If the cofactor of S with y=1 is 0, i.e. S is unsolvable when y=1, then the variable y can be removed from the problem. If the cofactor of S when z=0 is 0, then S is only solvable with z=1 and z is therefore committed. A test of all variables in S is performed in block 503 to see if they are all committed. If so, the process has completed. If not, the path having the worst timing characteristic in the list (block 504) is selected and we remove the two variables that compose it by constructing a new problem as the cofactor of S with both variables set to 0. Control transfers back to block 502, where again forced choices are made.

Placement and Routing Embodiments

Figure 6:
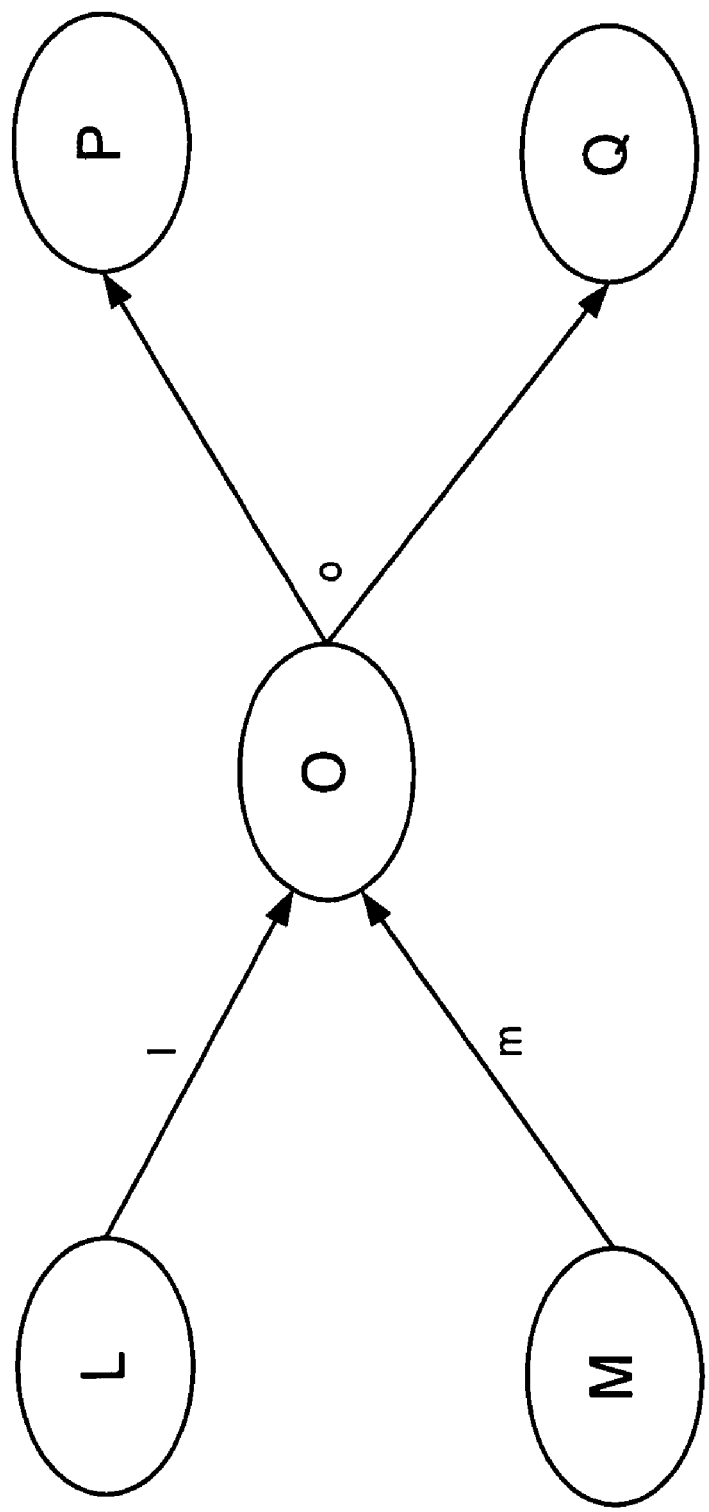
Figure 7A:
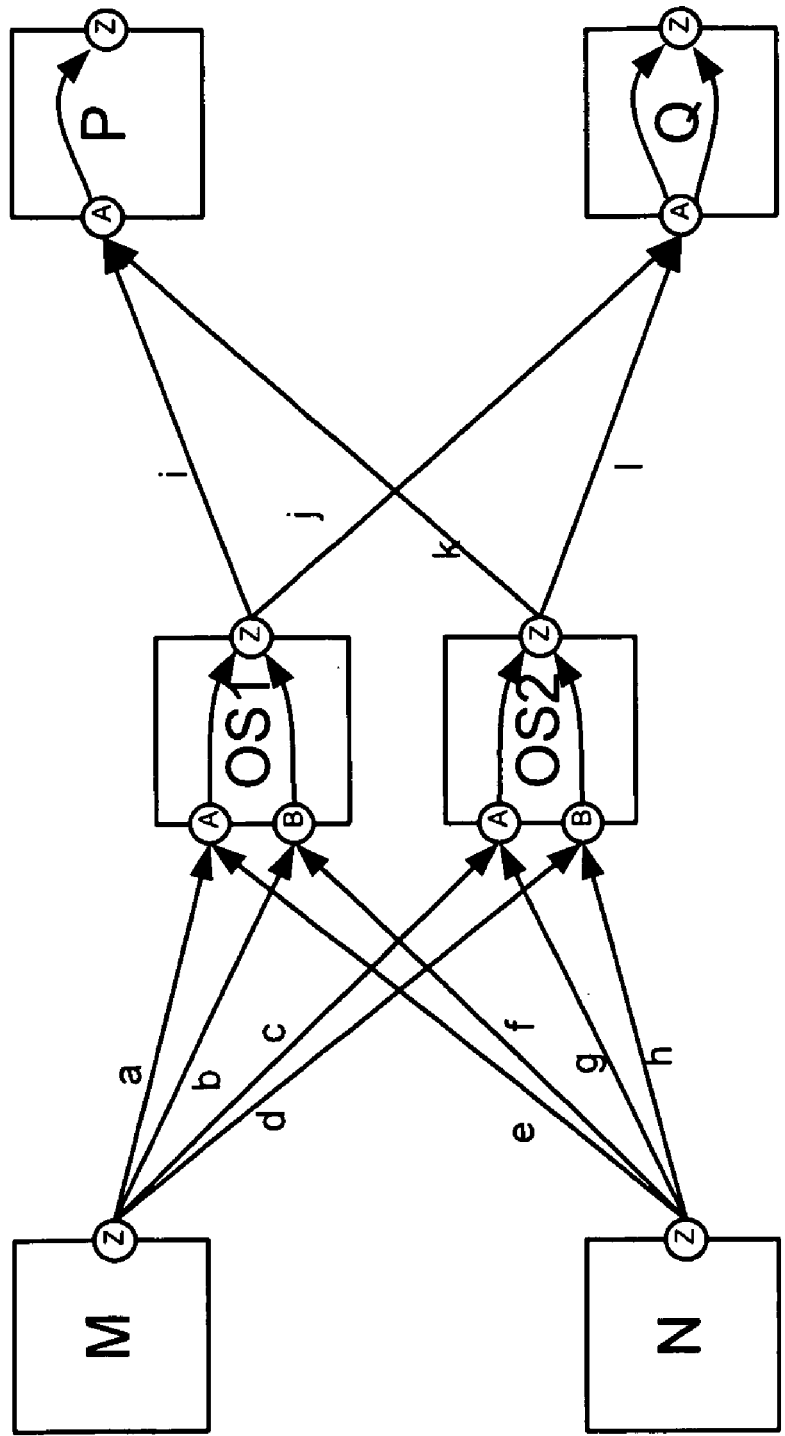

According to certain embodiments of the invention, the techniques set forth above may also be applied to a situation in which placement, routing and pin assignment are performed substantially simultaneously. FIG. 6 shows a netlist containing 5 cells. In this example, cell O fans out to both cells P and Q. FIG. 7A shows an implementation where cell O has two placement choices: OS1 and OS2.

In the formulation of the satisfiability problem, two placement choices are added as additional variables. The path variables in the satisfiability problem are specified in FIG. 7B according to one embodiment. Then the completeness requirement is:

((a|b) & (e|f) & OS1)|((c|d) & (g|h) & OS2) & ((i & OS1)|(k & OS2)) & ((j & OS1)|(l & OS2))

That is, the completeness depends upon the site (e.g., placement) of the intermediate cell, which may have different slacks for different paths. A conflict occurs when (a & e)|(b & f)|(c & g)|(d & h)

If we require that O occupies only OS1 and OS2, but not both, we must add an additional requirement to the satisfiability problem:

(!OS1 & OS2)|(OS1 & !OS2)

If O may occupy both OS1 and OS2, no additional requirement is made. Slacks are required for the following 2-level paths, each composed of the AND of 2 sub-paths, which will be successively eliminated from the satisfiability problem:

| | | | |
|---|---|---|---|
| a & i, | b & i, | a & j, | b & j, |
| c & k, | c & l, | d & k, | d & l, |

| | | | |
|---|---|---|---|
| e & i, | e & j, | f & i, | f & j, |
| g & k, | g & l, | h & k, | h & l |

Complex Placement Embodiments

Figure 8:
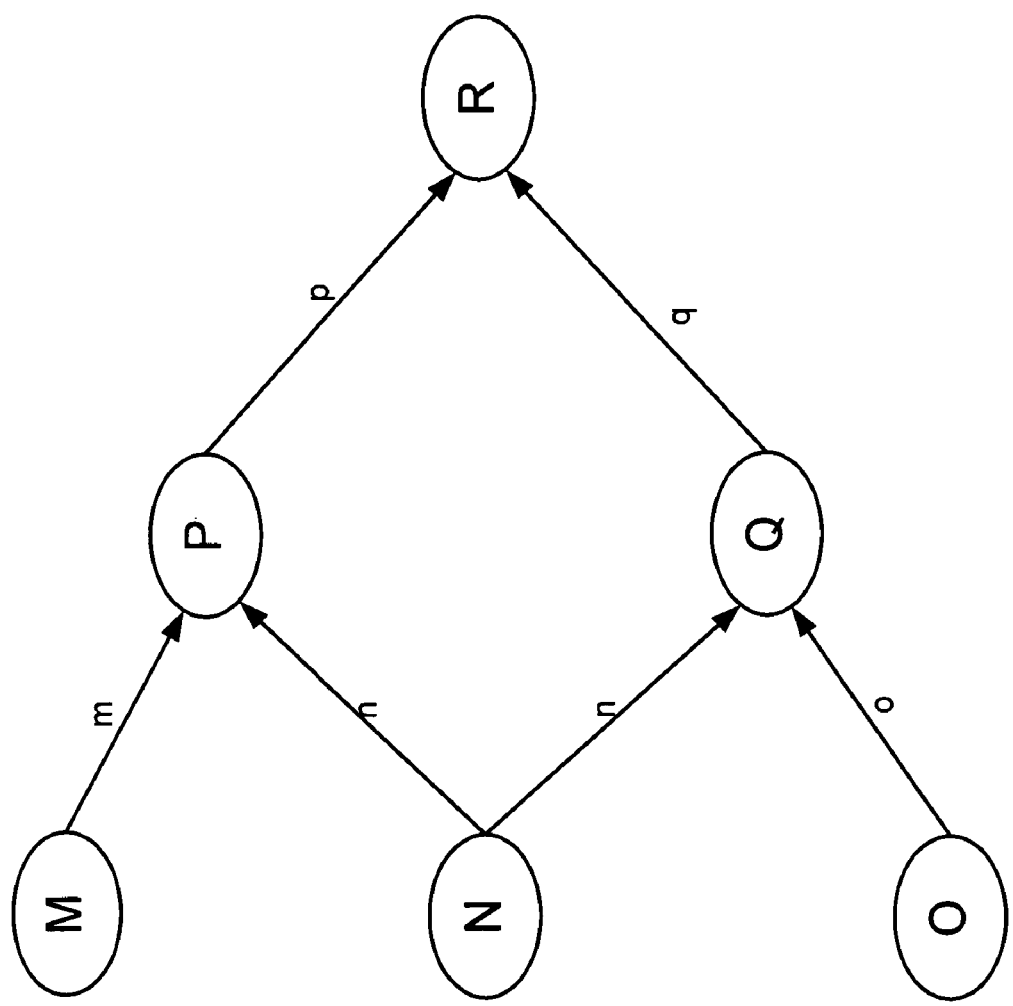
Figure 9A:
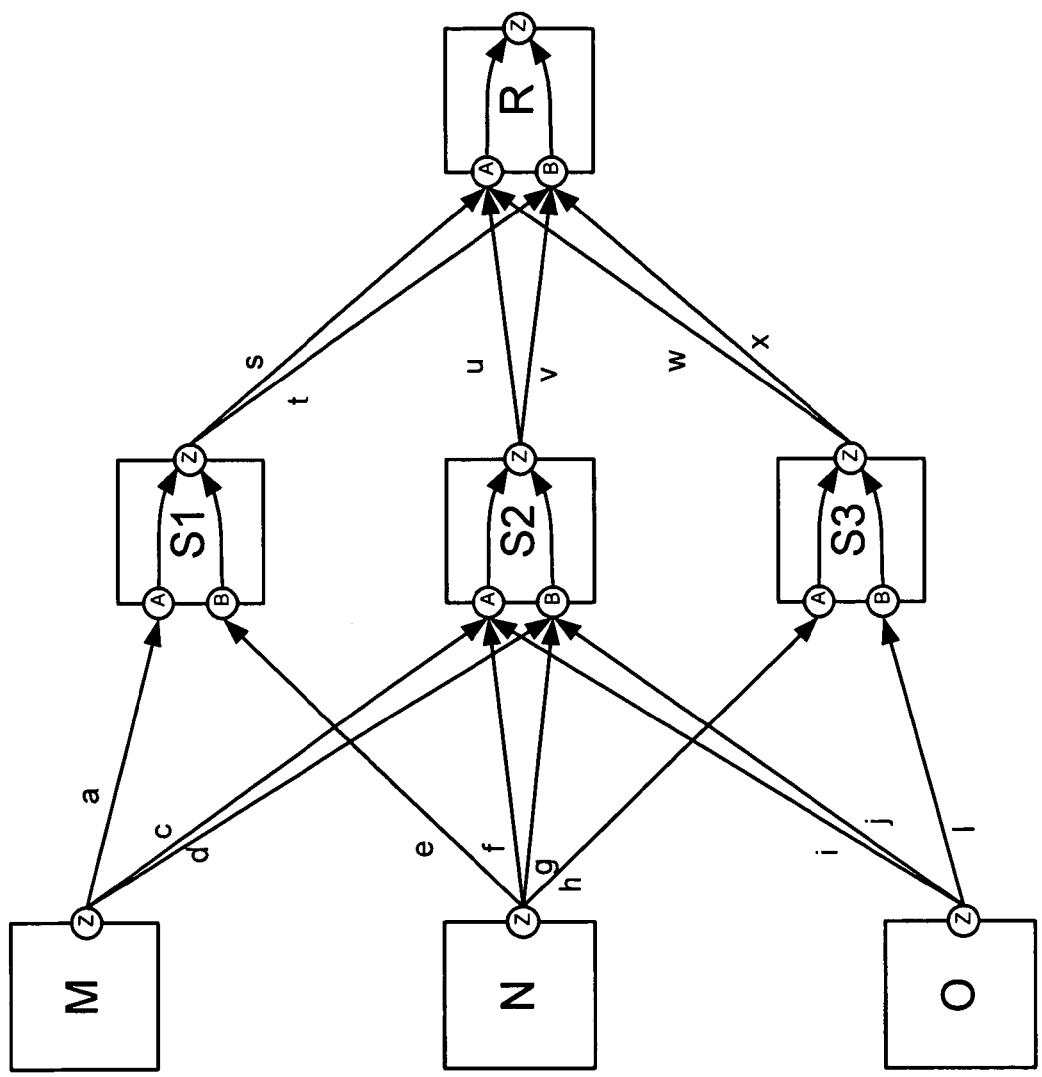

According to certain embodiments, the techniques set forth may also be applied to a complex placement situation. FIG. 8 shows a netlist that has been partially mapped to an implementation in FIG. 9A. In this example, the cells P and Q need to be mapped to sites S1, S2, and S3, with at most one cell occupying each site. It is apparent from the figures that cell P can occupy S1 or S2 and that cell Q can occupy S2 or S3. In a manner similar to the previous example, we will create 4 new variables that describe these placements—PS1, PS2, QS2 and QS3. The path variables in the problem are shown in FIG. 9B according to one embodiment.

Completeness requires:

((a & e & PS1)|(((c & g)|(d & f)) & PS2)) &
((l & h & QS3)|(((i & g)|(f & j)) & QS2)) &
((s|t) & PS1)|((u|v) & (PS2|QS2))|((w|x) & QS3) &
(PS1|PS2) & (QS2|QS3)

A conflict exists if:

(c & f)|(c & i)|(f & i)|
(d & g)|(d & j)|(g & j)|
(s & u)|(s & w)|(u & w)|
(t & v)|(t & x)|(v & x)

The condition requiring that only one cell may occupy a given site is (PS2 & !QS2)|(!PS2 & QS2)

Slacks are required for the following paths composed of two sub-paths which will be successively eliminated from the satisifiability problem:

| | | | | |
|---|---|---|---|---|
| a & s, | a & t, | e & s, | e & t, | c & u, |
| c & v, | d & u, | d & v, | f & u, | f & v, |
| g & u, | g & v, | i & u, | i & v, | j & u, |
| j & v, | h & w, | h & x, | l & w, | l & x |

Example of Data Processing System

Figure 10:
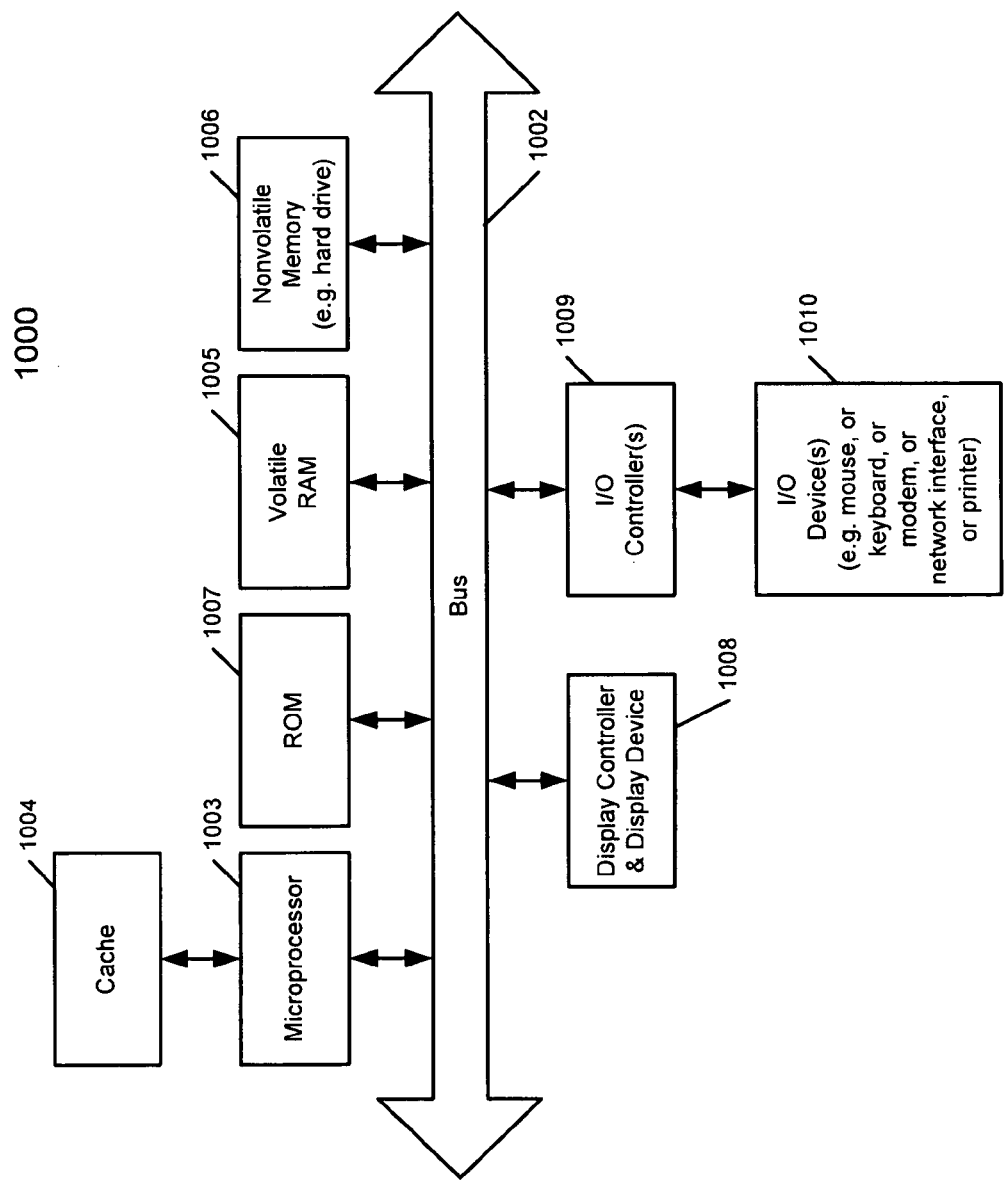
FIG. 10 is a block diagram illustrating an example of a data processing system which may be used with an embodiment of the invention.

FIG. 10 is a block diagram of a digital processing system, which may be used with one embodiment of the invention. For example, the system 1000 shown in FIG. 10 may be used perform a formal activity analysis using techniques as described above.

Note that while FIG. 10 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention. The computer system of FIG. 10 may, for example, be an Apple Macintosh computer or an IBM compatible PC.

As shown in FIG. 10, the computer system 1000, which is a form of a data processing system, includes a bus 1002 which is coupled to a microprocessor 1003 and a ROM 1007, a volatile RAM 1005, and a non-volatile memory 1006. The microprocessor 1003, which may be, for example, a PowerPC G4 or PowerPC G5 microprocessor from Motorola, Inc. or IBM, is coupled to cache memory 1004 as shown in the example of FIG. 10. The bus 1002 interconnects these various components together and also interconnects these components 1003, 1007, 1005, and 1006 to a display controller and display device 1008, as well as to input/output (I/O) devices 1010, which may be mice, keyboards, modems, network interfaces, printers, and other devices which are well-known in the art.

Typically, the input/output devices 1010 are coupled to the system through input/output controllers 1009. The volatile RAM 1005 is typically implemented as dynamic RAM (DRAM) which requires power continuously in order to refresh or maintain the data in the memory. The non-volatile memory 1006 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 10 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 1002 may include one or more buses connected to each other through various bridges, controllers, and/or adapters, as is well-known in the art. In one embodiment, the I/O controller 1009 includes a USB (Universal Serial Bus) adapter for controlling USB peripherals. Alternatively, I/O controller 1009 may include an IEEE-1394 adapter, also known as FireWire adapter, for controlling FireWire devices.

Thus, techniques for timing-optimal placement, pin assignment, and routing for integrated circuits have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-implemented method for designing an integrated circuit, the method comprising:

providing a circuit netlist having a subset of cells, signals, pins, and connections between pins;

providing an implementation architecture to implement the circuit netlist, the implementation architecture having resources including a subset of cell sites, pin sites, and routing resources;

providing implementation possibilities for implementing the circuit netlist as a list of possible paths, each path including a sequence of connected resources;

providing an attribute and corresponding value for each path in the list of possible paths;

removing paths from the list of possible paths that make the circuit implementation invalid;

committing paths to remain in the list of possible paths if such paths are required for making the circuit implementation valid;

identifying an uncommitted path from the list of possible paths with a worst-case value for the attribute and removing that path from the list of possible paths; and iteratively removing, committing and identifying paths until all paths are committed by using a computer;

wherein a valid circuit implementation is specified by the following conditions:

completeness, which requires each cell in the netlist to be assigned to at least one cell site, each in to be assigned to at least one in site and each signal to be assigned one or more resources; and satisfaction of constraints between paths, which requires that only one cell to be assigned to a cell site, only one pin to be assigned to a pin site, and only one signal to be assigned to a resource.

2. The method of claim 1, wherein the attribute includes a combination of two or more sub-attributes.

3. The method of claim 1, wherein the attribute includes the timing slack of the path.

4. The method of claim 1, wherein assignments required for completeness are consistent with the functionality of the circuit netlist.

5. The method of claim 1, wherein assignments required for completeness are consistent with the connectivity of the circuit netlist.

6. The method of claim 4, wherein completeness and constraint satisfaction are determined by the construction and solution of a Boolean satisfiability problem with:
resources represented by Boolean variables;
paths represented by a logical AND of Boolean variables; and
completeness and path constraints represented by expressions formed of Boolean variables.

7. The method of claim 4, wherein completeness and constraint satisfaction are determined by the construction and solution of a Boolean satisfiability problem with:
paths represented by Boolean variables; and
completeness and path constraints represented by expressions formed of Boolean variables.

8. The method of claim 6, wherein the Boolean satisfiability problem is solved using the method of binary decision diagrams.

9. The method of claim 6, wherein each routing resource and pin are represented by Boolean variables.

10. The method of claim 6, wherein each cell site is represented by a Boolean variable.

11. The method of claim 1 wherein the process of identifying, removing and committing paths is performed by a backtracking scheme, such backtracking scheme allowing choices of paths identified for removal or commitment to be rescinded in order to arrive at a valid circuit implementation.

12. A non-transitory, machine-readable storage medium storing instructions which when executed by a machine, cause the machine to perform a method for designing an integrated circuit, the method comprising:
providing a circuit netlist having a subset of cells, signals, pins, and connections between pins;
providing an implementation architecture to implement the circuit netlist, the implementation architecture having resources including a subset of cell sites, pin sites, and routing resources;
providing implementation possibilities for implementing the circuit netlist as a list of possible paths, each path including a sequence of connected resources;
providing an attribute and corresponding value for each path in the list of possible paths;
removing paths from the list of possible paths that make the circuit implementation invalid;
committing paths to remain in the list of possible paths if such paths are required for making the circuit implementation valid;
identifying a path from the list of possible paths with a worst-case value for the attribute and removing that path from the list of possible paths; and
iteratively removing, committing and identifying paths until all paths are committed;
wherein a valid circuit implementation is specified by the following conditions:
completeness, which requires each cell in the netlist to be assigned to at least one cell site, each in to be assigned to at least one in site and each signal to be assigned one or more resources; and
satisfaction of constraints between paths, which requires that only one cell to be assigned to a cell site, only one pin to be assigned to a pin site, and only one signal to be assigned to a resource.

13. The non-transitory machine-readable storage medium of claim 12, wherein the attribute includes a combination of two or more sub-attributes.

14. The non-transitory machine-readable storage medium of claim 12, wherein the attribute includes the timing slack of the path.

15. The non-transitory machine-readable storage medium of claim 12, wherein assignments required for completeness are consistent with the functionality of the circuit netlist.

16. The non-transitory machine-readable storage medium of claim 12, wherein assignments required for completeness are consistent with the connectivity of the circuit netlist.

17. The non-transitory machine-readable storage medium of claim 15, wherein completeness and constraint satisfaction are determined by the construction and solution of a Boolean satisfiability problem with:
resources represented by Boolean variables;
paths represented by a logical AND of Boolean variables; and
completeness and path constraints represented by expressions formed of Boolean variables.

18. The non-transitory machine-readable storage medium of claim 15, wherein completeness and constraint satisfaction are determined by the construction and solution of a Boolean satisfiability problem with paths represented by Boolean variables and completeness and path constraints represented by expressions formed of Boolean variables.

19. The non-transitory machine-readable storage medium of claim 17, wherein the Boolean Satisfiability problem is solved using the method of binary decision diagrams.

20. The non-transitory machine-readable storage medium of claim 17, wherein each routing resource and pin are represented by Boolean variables.

21. The non-transitory machine-readable storage medium of claim 17, wherein each cell site is represented by a Boolean variable.

22. A system for designing an integrated circuit, the system comprising:
a processor; and
a memory for storing instructions which when executed from the memory, cause the processor to perform a method for designing an integrated circuit, the method including:
providing a circuit netlist having a subset of cells, signals, pins, and connections between pins,
providing an implementation architecture to implement the circuit netlist, the implementation architecture having resources including a subset of cell sites, pin sites, and routing resources,
providing implementation possibilities for implementing the circuit netlist as a list of possible paths, each path including a sequence of connected resources,
providing an attribute and corresponding value for each path in the list of possible paths,
removing paths from the list of possible paths that make the circuit implementation invalid,
committing paths to remain in the list of possible paths if such paths are required for making the circuit implementation valid,
identifying a path from the list of possible paths with a worst-case value for the attribute and removing that path from the list of possible paths, and iteratively removing, committing and identifying paths until all paths are committed;
wherein a valid circuit implementation is specified by the following conditions:
completeness, which requires each cell in the netlist to be assigned to at least one cell site, each in to be assigned to at least one in site and each signal to be assigned one or more resources; and
satisfaction of constraints between paths, which requires that only one cell to be assigned to a cell site, only one pin to be assigned to a pin site, and only one signal to be assigned to a resource.

23. An apparatus for designing an integrated circuit, comprising:
means for providing a circuit netlist having a subset of cells, signals, pins, and connections between pins;
means for providing an implementation architecture to implement the circuit netlist, the implementation architecture having resources including a subset of cell sites, pin sites, and routing resources;
means for providing implementation possibilities for implementing the circuit netlist as a list of possible paths, each path including a sequence of connected resources;
means for providing an attribute and corresponding value for each path in the list of possible paths;
means for removing paths from the list of possible paths that make the circuit implementation invalid;
means for committing paths to remain in the list of possible paths if such paths are required for making the circuit implementation valid;
means for identifying a path from the list of possible paths with a worst-case value for the attribute and removing that path from the list of possible paths; and
means for iteratively removing, committing and identifying paths until all paths are committed;
wherein a valid circuit implementation is specified by the following conditions:
completeness, which requires each cell in the netlist to be assigned to at least one cell site, each in to be assigned to at least one in site and each signal to be assigned one or more resources; and
satisfaction of constraints between paths, which requires that only one cell to be assigned to a cell site, only one pin to be assigned to a pin site, and only one signal to be assigned to a resource.

* * * * *